United States Patent Office 2,908,722
Patented Oct. 13, 1959

2,908,722

PROCESS FOR PREPARING SATURATED MONOHYDRIC ALCOHOLS

John Alvin Casey, Plainfield, N.J., assignor to Air Reduction Company, Incorporated, New York, N.Y., a corporation of New York No Drawing. Application September 7, 1956
Serial No. 608,436

9 Claims. (Cl. 260—642)

This invention relates to the hydrogenation of acetylenic monohydric alcohols. More particularly, it pertains to the preparation of saturated monohydric alcohols by the catalytic hydrogenation of acetylenic monohydric alcohols.

Various processes, both catalytic and chemical, are known for hydrogenating acetylenic alcohols. However, heretofore, these processes have all been accompanied by disadvantages or drawbacks which rendered the process uneconomic or hazardous. For example, it has been proposed that acetylenic alcohols may be reduced chemically by reaction with metallic sodium, but the difficulties in the handling and the costs involved in the use of metallic sodium have ruled out such chemical reducing methods. It has also been suggested that acetylenic alcohols may be hydrogenated catalytically. Platinum and palladium have been used as catalysts for such hydrogenations, but both suffer from the disadvantages of their high cost and short catalytic life. While nickel catalysts previously suggested for hydrogenating acetylenic alcohols, are less readily poisoned and, therefore, have a longer useful life, they are not too active and require the use of elevated pressures and temperatures. Accordingly, processes employing such nickel catalyst systems necessarily were accompanied by such disadvantages as higher equipment and process costs and increased possibilities of undesirable side reactions as, for example, polymerization and decomposition.

It is an object of the present invention to provide an improved process for hydrogenating acetylenic monohydric alcohols. It is another object to provide an improved process for the preparation of saturated monohydric alcohols by the catalytic hydrogenation of the corresponding acetylenic monohydric alcohol at a pressure not substantially greater than atmospheric. Still further objects will be set forth in, and/or be obvious from, the following detailed description.

In accordance with the present invention, relatively high yields of saturated monohydric alcohols may be obtained by the catalytic hydrogenation at a pressure not substantially greater than atmospheric of the corresponding acetylenic monohydric alcohols in the presence of a Raney nickel catalyst which has been promoted by treatment with an alkaline material. While it is preferable to conduct the hydrogenation reaction in an inert solvent medium since the reaction is exothermic and better reaction control can be obtained, no such medium is necessarily required where the acetylenic monohydric alcohol is a liquid. Any suitable solvent for the acetylenic alcohol may be employed, although it is desirable to select a solvent whose boiling point and other physical properties are such as to facilitate and not hinder the separation of the various products. Suitable solvents include aliphatic alcohols such as methanol, ethanol, isopropyl alcohol and the like; esters of lower aliphatic alcohols such as methyl acetate, ethyl acetate, etc.; and aromatic hydrocarbons such as benzene, xylene, toluene and the like. Since anhydrous conditions are not critical in this reaction, water could be used as the reaction medium.

The nickel catalyst employed in the process of this invention is a Raney nickel catalyst which has been promoted with an alkaline material. The Raney nickel catalysts are well known in the art and may be prepared in the manner described in Raney, United States Patent 1,628,190. Although alkali metal hydroxides, such as sodium and potassium hydroxide are preferred, any strongly alkaline material may be used to promote or activate the Raney nickel catalyst to render it suitable for use in the process of this invention. For example, alkali metal carbonates, bicarbonates, and alkoxides may also be used. The alkaline promoted Raney nickel catalyst may be prepared by admixing an alkaline material with, or adding it to, a washed commercially available Raney nickel catalyst; or the catalyst may be prepared by allowing the residual alkaline material resulting from the digestion of a nickel alloy with an alkali in the preparation of Raney nickel to remain in the composition. Only small amounts, i.e., in the order of 0.1 to 1.0% by weight based on the weight of Raney nickel, of alkaline material need be present in the catalyst. However, the presence of the alkaline material is essential for proper catalyst activity.

It is particularly surprising, in view of United States Patent 2,157,365 to Thomas H. Vaughan, to find that an alkaline material containing Raney nickel catalyst promotes the production of saturated monohydric alcohols. For it was heretofore believed that such treatment poisoned the catalytic activity of Raney nickel, and in hydrogenations of acetylenic glycols selectively produced ethylenic glycols rather than saturated glycols.

It has been observed that after the catalyst has been used for a period of time, sometimes involving a number of hydrogenations, its catalytic activity decreases. It is necessary, therefore, to reactivate the catalyst. This can be done conveniently by adding an alkaline material, either alone or in admixture with the solvent medium, directly to the reaction mixture or, if desired, the catalyst may be removed from the reaction mixture and separately treated with an alkaline material.

The temperature used will depend upon a variety of factors, including the effectiveness of agitation, the particular acetylenic alcohol to be hydrogenated, and the solvent medium employed. Optimum results are obtained at temperatures of from about 50–60° C. While the reaction would proceed at temperatures below about 35° C., the rate of reaction would be considerably reduced in most cases and in some instances reaction would not be sustained. It is therefore desirable to maintain a reaction temperature of about 35° C. or above. Higher reaction temperatures are possible, but as the reaction is exothermic, problems of reaction control may develop. The upper limit of reaction temperature may be considered to be the boiling point of the solvent reaction medium.

One of the unusual results obtained when operating in accordance with the process of this invention is that pressures substantially greater than atmospheric are not required. Atmospheric pressure of about 15 pounds per square inch absolute are sufficient to obtain relatively high yields of saturated alcohols from the corresponding acetylenic alcohol.

Since tertiary acetylenic alcohols are readily susceptible to acid catalyzed dehydration, it is important in distilling or handling the reaction mixture containing such alcohols that acid contamination be avoided. In carrying out the hydrogenation in accordance with this invention, it is also preferred to agitate the reacting mixture as by stirring or other mechanical means. The catalyst is preferably used in amounts of about 7 to 8 percent by weight, based on the weight of acetylenic alcohol to be reacted.

The process of this invention can be utilized to prepare any of a variety of saturated monohydric alcohols by the hydrogenation of an actylenic monohydric alcohol. The process has been found especially suitable for the hydrogenation of those actylenic alcohols which may be represented by the formula

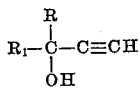

wherein R and $R_1$ may be the same or different radical selected from the group of hydrogen, alkyl, cycloalkyl, and aryl radicals. Preferably, R and $R_1$ are so selected that the total number of carbon atoms in the acetylenic alcohol molecule is not more than about 21.

Among the acetylenic monohydric alcohols which can be hydrogenated in accordance with the present invention are: 1-propyn-3-ol; 3-methyl-1-butyn-3-ol; 3-methyl-1-pentyn-3-ol; 1-ethynylcyclohexane-1-ol; 3,5-dimethyl-1-hexyn-3-ol; 3-methyl-1-nonyn-3-ol; 3,4-dimethyl-1-pentyn-3-ol; 5-methyl-3-isobutyl-1-hexyn-3-ol; 3,6-dimethyl-1-heptyn-3-ol; 3-phenyl-1-butyn-3-ol; 3-ethyl-1-octyn-3-ol; 3-ethyl-1-heptyn-3-ol; 3-methyl-1-decyn-3-ol; 3-ethyl-1-pentyn-3-ol; 1-butyn-3-ol; 3-phenyl-1-propyn-3-ol; 3,3-diphenyl-1-propyn-3-ol; 3-cyclopropyl-1-butyn-3-ol.

The following examples will serve to further illustrate the invention.

*Example 1*

An alkaline promoted Raney nickel catalyst was prepared as follows. To 200 cc. of a 17% sodium hydroxide solution was added, in portions, 23 grams of a 50% nickel-aluminum alloy. The temperature of the solution was maintained below 20° C. by external cooling. After all of the alloy had been added, the mixture was heated at 80–90° C. for two hours. The mixture was cooled, then the alkali was decanted off and the residual nickel was washed with water until the last wash gave a negative test for aluminum. A small amount of alkali remained in the catalyst.

To 11.5 grams of catalyst, as prepared above, was added 154 grams of 3-methyl-1-nonyn-3-ol dissolved in 250 cc. of methanol. Hydrogen was introduced into the reaction mixture through a sintered gas sparger, with continuous and rapid agitation of the mixture by mechanical means. Reaction proceeded readily at atmospheric pressure; since the reaction was exothermic, external cooling was required to maintain the solution temperature between 50°–60°. Hydrogen was added continuously for 4.9 hours, then discontinued when the reaction temperature fell rapidly. After the hydrogenation was completed, the alcohol solution was decanted from the catalyst. Distillation of solvent yielded a 151 gram residue. When this residue was distilled at reduced pressure, 122.5 grams of 3-methyl-3-nonanol were obtained corresponding to a yield of 71%. The distillation range was 75°–76° C. at 5 mm.; $n_D^{20}$ was 1.4352.

The separated catalyst, after washing with methanol, may be used for further hydrogenations.

*Example 2*

The recovered catalyst that had been used in Example 1 and other hydrogenations was added to 151 grams of 3-isobutyl-5-methyl-1-hexyn-3-ol in 200 cc. of methanol. Hydrogen was bubbled through the solution with rapid stirring. A constant temperature indicated that no exothermic reaction was proceeding; the heating of the solution first to 40° C., then to 50° C. was not successful in initiating the reaction, in both cases rapid temperature fall-off was noted as soon at heating was discontinued. The catalyst was spent.

To the reaction vessel, 1 cc. of a 1 N solution of NaOH in methanol was then added. Immediate and rapid temperature rise indicated catalyst reactivation, intermittent cooling was required to maintain the temperature at 50° to 60° C. Reaction and hydrogen addition continued for 1.5 hours after the alcoholic alkali was introduced. Atmospheric pressures were employed.

The catalyst was removed by filtration, then the solvent methanol was distilled off at atmospheric pressure. A 30 inch packed column was used for the reduced pressure distillation of the residue, which yielded 121.5 grams of the alcohol; 3-isobutyl-5-methyl-3-hexanol, $n_D^{20}$ —1.4368; distillation range 72–73° C. at 6 mm.; the yield was calculated to be 75%.

*Example 3*

In order to reactivate the catalyst, 1.5 cc. of 1 N alcoholic sodium hydroxide was added to a solution of 157.5 grams of 3,5-dimethyl-1-hexyn-3-ol dissolved in 200 cc. of methanol containing 11.5 grams of spent alkali promoted Raney nickel catalyst prepared as in Example 1, above. Hydrogen addition was begun; the temperature rise of the reaction mixture necessitated the application of external cooling to maintain a temperature of 50–60° C. Atmospheric pressures were employed. Hydrogen gas addition was continued for 2.5 hours. After the hydrogenation was completed, the reaction mixture was filtered and the solvent was recovered by distillation at atmospheric pressure. The residue was then distilled at reduced pressure, i.e., 57°–58° C. at 15 mm., through a Vigreaux column. Yield: 122 grams of 3,5-dimethyl-3-hexanol, equivalent to a conversion of 77%. Refractive index of 3,5-dimethyl-3-hexanol is $n_D^{20}$ 1.4266.

The foregoing examples have been given for purposes of illustration. It will be evident to those skilled in the art that the invention is capable of various modifications and adaptations within the scope of the appended claims.

What is claimed is:

1. A process for preparing a saturated monohydric alcohol from the corresponding acetylenic monohydric alcohol which comprises hydrogenating an acetylenic monohydric alcohol in liquid form containing not more than about 21 carbon atoms of the formula

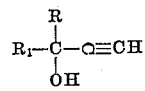

wherein each of R and $R_1$ is a radical selected from the group consisting of hydrogen, alkyl, cycloalkyl, and aryl, in the presence of a Raney nickel catalyst promoted by a small but effective amount of at least about 0.1% of a strongly alkaline compound at a pressure not substantially greater than atmospheric, and at a temperature of above about 35° C. sufficient to maintain the hydrogenation reaction but not substantially exceeding the boiling point of the liquid present.

2. A process for preparing saturated monohydric alcohols as defined in claim 1, wherein said hydrogenation is conducted in an inert solvent reaction medium, and the temperature does not substantially exceed the boiling point of said solvent reaction medium.

3. A process as defined in claim 1, wherein said saturated alcohol prepared is 3-methyl-3-nonanol and said acetylenic alcohol hydrogenated is 3-methyl-1-nonyn-3-ol.

4. A process as defined in claim 1, wherein said saturated alcohol prepared is 3-isobutyl-5-methyl-3-hexanol and said acetylenic alcohol hydrogenated is 3-isobutyl-5-methyl-1-hexyn-3-ol.

5. A process as defined in claim 1, wherein said saturated alcohol prepared is 3,5-dimethyl-3-hexanol and said acetylenic alcohol hydrogenated is 3,5-dimethyl-1-hexyn-3-ol.

6. A process for preparing a saturated monohydric alcohol from the corresponding acetylenic alcohol which comprises hydrogenating an acetylenic monohydric alcohol in liquid form containing not more than about 21 carbon atoms of the formula

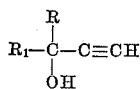

wherein each of R and $R_1$ is a radical selected from the group consisting of hydrogen, alkyl, cycloalkyl, and aryl, in the presence of a Raney nickel catalyst promoted by a small but effective amount of at least about 0.1% of a strongly alkaline compound and in an inert solvent reaction medium at a pressure not substantially greater than atmospheric and a temperature above about 35° C., and not substantially exceeding the boiling point of said solvent reaction medium and, when said catalyst is spent, adding a small but effective amount of said strongly alkaline material to the reaction mixture and continuing said hydrogenation.

7. A process as defined in claim 6, wherein said saturated alcohol prepared is 3-methyl-3-nonanol and said acetylenic alcohol hydrogenated is 3-methyl-1-nonyn-3-ol.

8. A process as defined in claim 6, wherein said saturated alcohol prepared is 3-isobutyl-5-methyl-3-hexanol and said acetylenic alcohol hydrogenated is 3-isobutyl-5-methyl-1-hexyn-3-ol.

9. A process as defined in claim 6, wherein said saturated alcohol prepared is 3,5-dimethyl-3-hexanol and said acetylenic alcohol hydrogenated is 3,5-dimethyl-1-hexyn-3-ol.

References Cited in the file of this patent

UNITED STATES PATENTS

| | | |
|---|---|---|
| 2,222,302 | Schmidt et al. | Nov. 19, 1940 |
| 2,516,826 | Smith | July 25, 1950 |
| 2,604,455 | Reynolds et al. | July 22, 1952 |
| 2,737,534 | Taylor et al. | Mar. 6, 1956 |

FOREIGN PATENTS

| | | |
|---|---|---|
| 508,944 | Great Britain | June 26, 1939 |
| 698,019 | Great Britain | Oct. 7, 1953 |
| 698,954 | Great Britain | Oct. 28, 1953 |

OTHER REFERENCES

Ruzicka et al.: Helvetica Chimica Acta, vol. 21 (1938), pp. 597–601.

Johnson: "Acetylenic Compounds," vol. 1, Arnold, London, 1946; pp. 100, 101.

Kubomatsu: Science and Industry (Japan), vol. 28 (1955), pp. 306–9 via Chem. Abstracts, vol. 50, 10500 (1956).